(12) United States Patent
Ebersole

(10) Patent No.: US 6,341,671 B1
(45) Date of Patent: Jan. 29, 2002

(54) WHEELCHAIR PARKING BRAKE

(76) Inventor: Douglas Ebersole, 525 Baja Dr., San Diego, CA (US) 92115

( * ) Notice: Subject to any disclaimer, the term of this patent is extended or adjusted under 35 U.S.C. 154(b) by 0 days.

(21) Appl. No.: 09/592,138

(22) Filed: Jun. 12, 2000

(51) Int. Cl.$^7$ .................................................. B60T 1/00
(52) U.S. Cl. ......................................... 188/2 F; 188/31
(58) Field of Search ..................... 188/2 F, 31, 265, 188/20, 69; 280/304.1, 250.1

(56) References Cited

U.S. PATENT DOCUMENTS 5,799,756 A * 9/1998 Roberts et al. ............. 188/2 F

FOREIGN PATENT DOCUMENTS

JP 210338 * 8/2000

* cited by examiner

Primary Examiner—Douglas C. Butler
(74) Attorney, Agent, or Firm—Fuess & Davidenas

(57) ABSTRACT

A sliding plunger, normally about 1 cm. OD with a 0.5 cm tip distal end, controllably extends under spring force from a housing mounted to a wheelchair's frame transversely into a juxtaposed complimentary hole, preferably one of a circumferential array of approximately 24 such holes of racetrack shape, within an annular disk, typically 10 cm. OD with a 3.5 cm. ID center opening, that is mounted to the hub of the wheelchair's wheel at a position centered about the wheelchair's axle between the wheelchair's wheel and the wheelchair's frame. A cable extends from the sliding plunger's proximal end to a lever selectively activated by and occupant of the wheelchair to selectively permit that the sliding plunger should either (i) extend under spring force into a juxtaposed hole of the annular disk, locking the wheelchairs wheel against further rotation, or else (ii) withdraw easily from a hole, permitting wheel rotation.

11 Claims, 3 Drawing Sheets

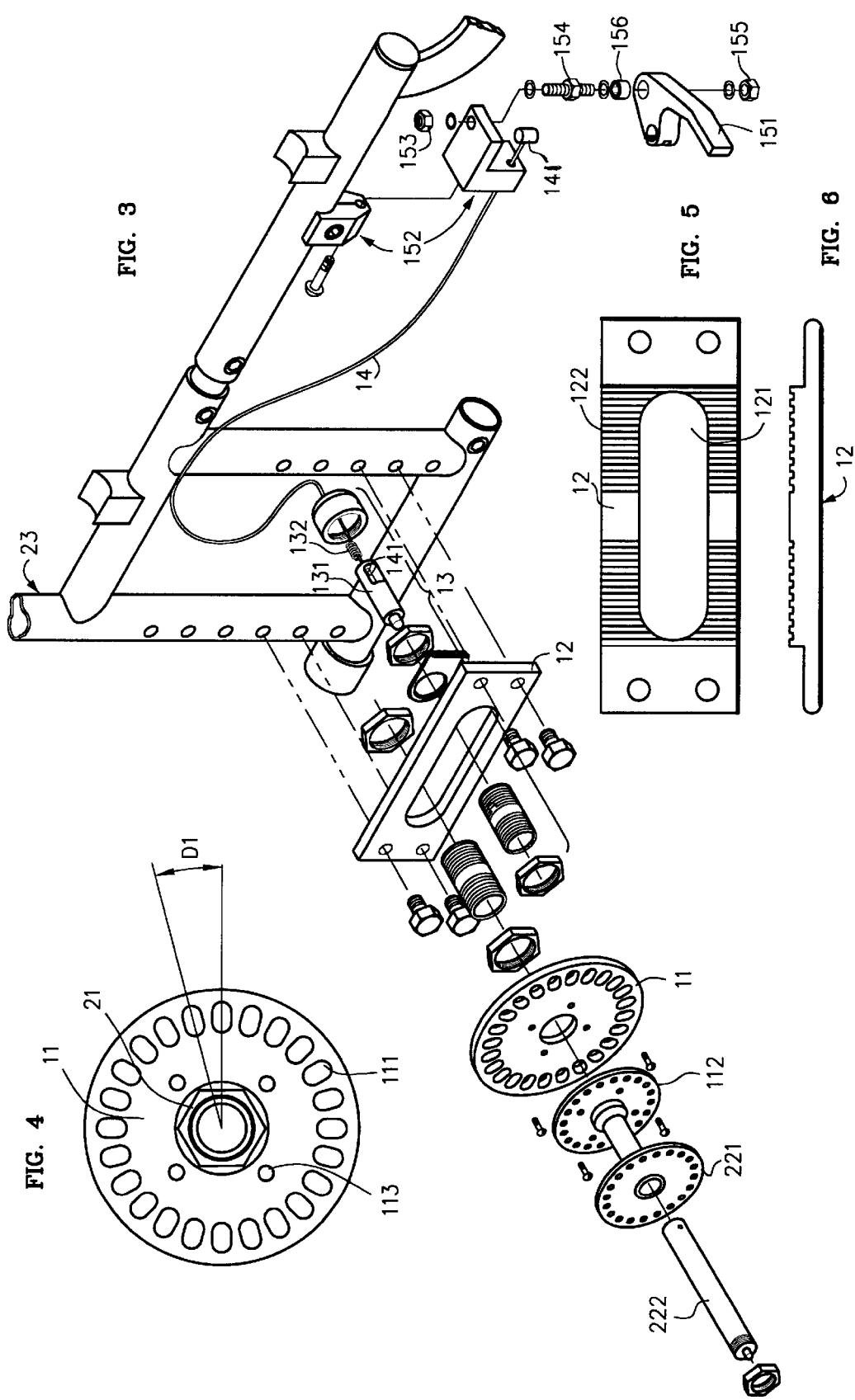

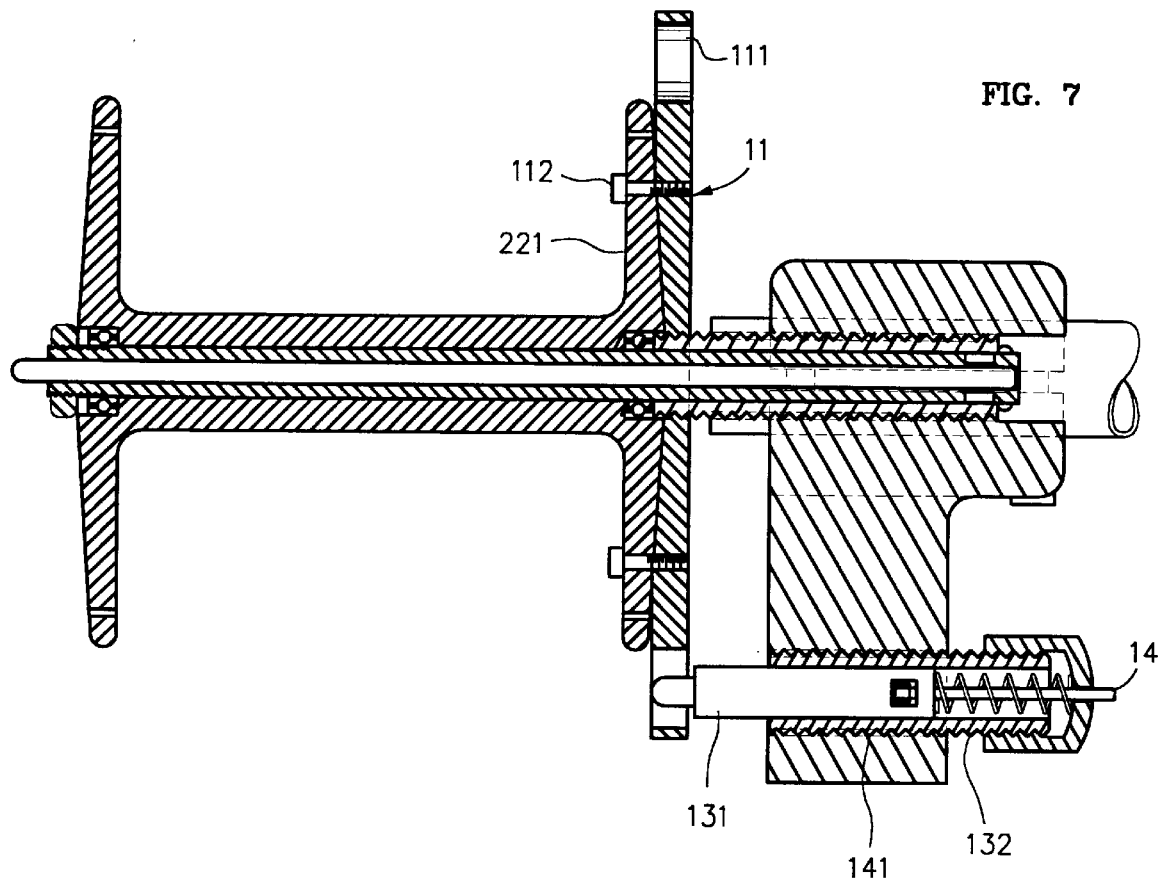
FIG. 7
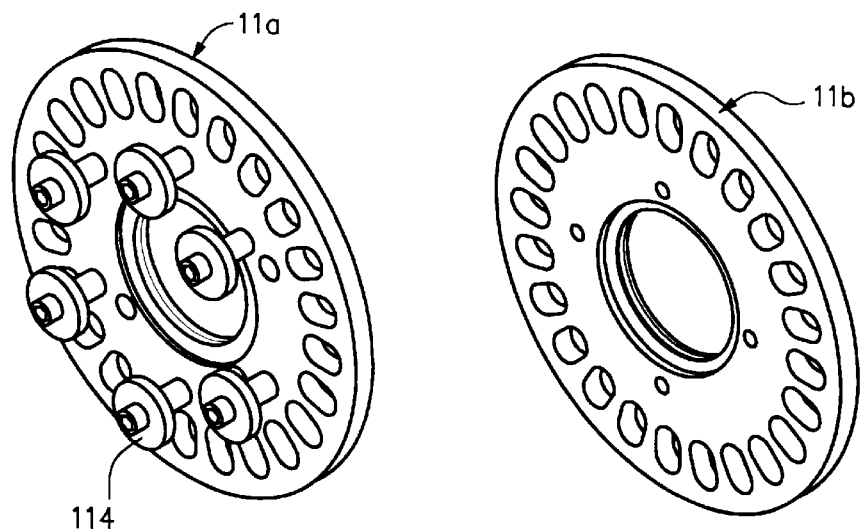
FIG. 8
FIG. 9

WHEELCHAIR PARKING BRAKE

BACKGROUND OF THE INVENTION

1. Field of the Invention

The present invention generally concerns parking brakes, wheel locks, hill holders and like devices fitted to wheeled trolleys and conveyances, particularly to wheelchairs.

The invention particularly concerns a parking brake for a wheelchair.

2. Description of the Prior Art

2.1 General Background

Existing wheel chair wheel locks based on friction between a moveable portion of a brake, or lock, and the tire or wheel of the wheelchair suffer in effectiveness in that a limited area of contact between the brake and the wheel permit the wheel to slip and rotate under high lateral loads, such as during the egress of the wheelchair occupant from the wheelchair. It is desirable that wheelchair parking brake, or lock, should substantially preclude any further wheel rotation whatsoever, once engaged, nonetheless to being easy and reliable to engage and dis-engage.

2.2 Specific Background

U.S. Pat. No. 4,462,605 to Morgan, et. al. for a WHEELCHAIR HAVING ANTI-ROLLBACK MECHANISM shows propulsion wheels of a manually propelled wheelchair equipped with one-way engaging and one-way free-wheeling clutch devices which cooperate with races fixed to the wheelchair frame, whereby unwanted backward movement of the wheelchair is prevented and forward movement at all times is enabled. An override mechanism including a spider attached to each hand propulsion ring disables the one-way engaging clutch devices when the wheelchair occupant intentionally moves the propulsion wheels in a backward mode. No controls separate from the manual propulsion wheels are present, assuring the chair occupant constant control of the chair through the hand propulsion rings at all times.

U.S. Pat. No. 4,538,825 to Delahoussaye, et. al., for a WHEELCHAIR ANTI-ROLLBACK MECHANISM shows the customary side hand propulsion ring adjacent to each main wheel of a manual wheelchair mounted through a lost motion connection between the propulsion ring and main wheel so that the propulsion ring can have limited rotational movement relative to the main wheel. A friction brake drum or partial drum fixed to the wheelchair frame inside of the main wheel is engaged by at least one of a plurality of circumferentially spaced over center friction locking devices pivotally held on the main wheel. Each over center friction locking device is moved by a release element to a non-locking position relative to the drum or partial drum in response to reverse movement of the propulsion ring by a chair occupant. Economy and ease of operation are provided for. The wheelchair occupant need not remove his or her hand from the propulsion ring when operating the anti-rollback mechanism.

U.S. Pat. No. 4,570,756 to Minnebraker, et. al., for a BRAKE DEVICE FOR WHEELCHAIRS shows a brake device for use with wheelchairs of the type having a main frame and a pair of spaced apart large diameter driving wheels, such as rear wheels. The brake device comprises a bracket or other mounting element for mounting to the wheelchair frame and a lever arm which is shiftable to a wheel locking position to move a brake tab into engagement with the rear wheel of a wheelchair to lock the wheel against further rotation. The lever arm is also capable of being shifted to a reverse or non-locking position so that it moves the tab out of engagement with the wheelchair driving wheel and to a position where it cannot be engaged with the driving wheel to permit free-wheeling movement thereof. The brake device is constructed so that the tab is moveable to a non-interfering position where it is generally parallel to the plane of rotation of the wheel and is not likely to be contacted by the hand of a user. In one embodiment, the tab is manually moveable to the non-interfering position. In another embodiment, the tab is automatically moved to the non-interfering position when the lever arm is shifted away from the locking position.

U.S. Pat. No. 4,691,933 to Strauss for a WHEELCHAIR PARKING BRAKE shows a wheel locking device for use on a wheelchair, including a locking bar connected to a shaft that is movably axially and rotationally within a fixed tube, by a single operating handle. As the operating handle is moved from a release position to a locking position, the shaft is first axially translated by means of a cam on the handle, and simultaneously rotated by means of a guide pin extending radially from the shaft and engaging a slot in the tube, to move the locking bar from a retracted position well clear of a wheel of the chair to an operative position located transversely with respect to the wheel circumference. Further movement of the operating handle translates the locking bar transversely into locking engagement with the wheel.

U.S. Pat. No. 4,749,064 to Jinno, et. al., for a BRAKE SYSTEM FOR A WHEELCHAIR shows a brake system for a wheelchair comprises a base plate fixed to a frame of the wheelchair and a swing lever pivotally mounted to the base plate and provided with a brake member engagable with a circumferential surface of a wheel of the wheelchair. A toggle joint mechanism composed of two pivotally interconnected links is pivotally mounted to the base plate and connected to the swing lever to move the swing lever between an extended braking position and a retracted inoperative position. An operating lever is pivotally mounted to the pivot which interconnects the two links of the toggle joint mechanism. The operating lever has cam surfaces engageable with the two links to depress the latter when the operating lever is moved in either of two directions by pushing it or pulling it. Such action drives the swing lever into braking engagement with the wheel. A biasing spring is provided to urge the links of the toggle mechanism towards retracted position.

U.S. Pat. No. 4,805,711 to Lautzenhiser for a MECHANICAL CONTROL MECHANISM FOR CONVEYANCE shows an electric wheelchair, or other conveyance, provided with a function control which includes a unitary control, and which is effective to control applying and releasing of power transmitted from an electric motor to a wheel, or to another type of propulsion element, and to control applying and releasing of a parking brake, in response to positioning of the unitary control.

U.S. Pat. No. 4,749,064 to Jinno, et. al., for a BRAKE SYSTEM FOR A WHEELCHAIR shows a brake system for a wheelchair comprises a base plate fixed to a frame of the wheelchair and a swing lever pivotally mounted to the base plate and provided with a brake member engagable with a circumferential surface of a wheel of the wheelchair. A toggle joint mechanism composed of two pivotally interconnected links is pivotally mounted to the base plate and connected to the swing lever to move the swing lever between an extended braking position and a retracted inoperative position. An operating lever is pivotally mounted to the pivot which interconnects the two links of the toggle joint mechanism. The operating lever has cam surfaces engageable with the two links to depress the latter when the operating lever is moved in either of two directions by pushing it or pulling it. Such action drives the swing lever into braking engagement with the wheel. A biasing spring is provided to urge the links of the toggle mechanism towards retracted position.

U.S. Pat. No. 5,174,418 for a WHEEL LOCK MECHANISM FOR A WHEELCHAIR shows a wheelchair wheel lock system is provided that can be adapted for either pull-to-lock or push-to-lock operation. The wheel lock system includes a function plate with first and second pivot holes. An operating lever is attached to the function plate, and rotation of the lever causes rotation of the function plate and thereby moves a contact arm into engagement with the wheel of the wheelchair to lock the wheel against movement. The operation of the wheel lock system is changed between push-to-lock and pull-to-lock by adapting the function plate to rotate about either the first pivot hole or the second pivot hole. The operating lever can be attached to the function plate in a variety of orientations, providing added flexibility in the operation of the wheel lock system.

U.S. Pat. No. 5,355,977 to Kuschall for a PARKING BRAKE FOR A WHEELCHAIR shows a parking brake fitted to the wheelchair frame largely regardless of the nominal position of the brake element, and conversely the position of the brake element can be exactly matched to the position of the rear wheel. A two-piece clamp connects a cylindrical bearer to a part of the wheelchair frame and allows the bearer's rotation and lengthwise displacement relative to the frame. One end of the bearer holds the pivoting brake element and locking lever. One arm of the locking lever acts together with the brake element and has two recesses. When the locking lever is moved to a released position, spring action forces the brake element to engage one of the recesses and to be located beside the rear wheel approximately perpendicular to the wheel's rotational axis. When the locking lever is moved to a braking position, the brake element engages the second recess and is located more or less parallel to the rotational axis of the rear wheel. This ensures that the brake element moves accurately to clearly defined end positions.

U.S. Pat. No. 5,472,066 to Schillo, et. al., for an ARRESTING BRAKE FOR A WHEELCHAIR relates to an arresting brake for a wheelchair, having a braking element which is articulated pivotally on a retaining element and, by pivoting a hand brake lever, can be pivoted into an arresting position in which the braking element bears, under pressure, on a wheelchair wheel or its tire. In order to provide a versatile arresting brake for wheelchairs, the invention proposes that the hand brake lever also be mounted on the retaining element, which is pivotally suspended on an adaptor which exhibits fastening device, for fixing it on the wheelchair frame, and a pivot pin which is located in the longitudinal direction of the wheelchair when the adaptor is mounted and about which the retaining element can be pivoted out of a positive locking catch position, which defines the braking function position, into a storage (rest) position located within the outer contour of the wheelchair.

Finally, as what may possibly be the closest prior art to the present invention of which the inventor is aware, U.S. Pat. No. 5,799,756 to Roberts, et. al., for SURELOCK WHEELCHAIR BRAKES concerns a brake system for a wheelchair having two assemblies, one for each of wheel. Each assembly comprises a mounting bracket adapted to be connected to a frame portion of a wheelchair, a handle pivotally attached at a pivot point to the mounting bracket, a cable having one end connected to the handle and another end connected to a pivot arm. The pivot arm is pivotally attached to one end of a cam rod. The rod is attached to another mounting bracket adapted to be connected to another frame portion of the wheelchair and has a latching mechanism connected to a portion of the rod and biased into engagement with a splined disc by a spring. The disc is adapted to be connected to a hub of the wheel chair. In use, when the occupant of the wheel chair pivots the handle past a certain rotary position with respect to the pivot point of the handle, either in a forward or rearward direction, the spring forces the latching mechanism into either a positive braking engagement with the disc, thereby locking the wheelchair against movement, or a released position in which the wheelchair is free to move. Different versions are available for wheelchairs having canted wheels.

The present invention will be seen to employ a disk affixed to a wheelchair wheel, but without the peripheral splines of the disk of Roberts, et al., which splines can detrimentally catch on clothing, wraps and the like worn or used by the occupant of the wheelchair. Additionally, the present invention will be seen to employ a plunging, as opposed to a pivoting, mechanism for locking the wheelchair wheel against movement relative to the wheelchair frame.

The present invention will further be seen to realize positive wheel locking by use of an different engagement mechanism that is differentiated from that of Roberts, et al., by being (i) smoother acting to engage and lock a wheel that is initially rolling, and (ii) self-aligning, meaning that the engaging parts will mesh together securely and well no matter what torsional forces on the wheelchair frame and wheels—as may be due to, for example, uneven terrain—may be present. Furthermore, with proper orientation of parts, no separate version of the wheelchair wheel lock of the present invention is necessary for wheelchairs having canted wheels: one version suits all applications.

SUMMARY OF THE INVENTION

The present invention contemplates a strongly-holding, zero-slip, feather-touch quick-action easy- and positive-actuating and releasing, lightweight, economical, universal, retrofittable parking brake and wheel lock for a wheelchair.

In accordance with the present invention an annular disk of a size and form that fits nearly all wheelchairs is mounted to the hub of the wheelchair's wheel at a position centered about the wheelchair's axle and between the wheelchair's wheel and the wheelchair's frame. The disk has and presents a circumferential array of holes, normally about 24 such in its circumferential peripheral, or exterior, region.

Meanwhile a sliding plunger controllably extends under spring force from a housing mounted to a wheelchair's frame. A distal end tip of the sliding plunger extends transversely into a juxtaposed complimentary hole of the annular disk, therein locking the disk against further rotation. Spring-loaded extension of the sliding plunger is prevented, loosing the wheelchair wheel for rotation, by pulling on a cable connecting between the proximal end of the sliding plunger and a lever selectively activated by an occupant of the wheelchair.

1. A Wheelchair Wheel Lock

Therefore, in one of its aspects the present invention is embodied in a wheelchair wheel lock. The wheel lock is employed on a wheelchair having a frame and an axle, the axle rotationally attaching wheels having wheel hubs.

The wheel lock includes an annular disk that attaches the hub of a wheelchair wheel at a position centered about the wheelchair axle between the wheelchair wheel and the wheelchair frame, thereby to rotate with the wheelchair wheel. The annular disk so attaches the hub by at least one attachment feature. The annular disk also has and presents, circumferentially arrayed in its annulus, a number of engagement features. These engagement features may suitably be mechanically engaged so as to prevent rotation of the disk, and of the wheelchair wheel to which the annular disk is affixed. In other words, they, and the annular disk, are sufficiently robust, and strong.

The wheel lock also includes a moveable member which is mounted to the frame of the wheelchair proximate the annular disk. The moveable member has a distal end of complimentary configuration to the engagement features of the disk. The moveable member is moveable under and by force controlled by an occupant of the wheelchair to extend at a first time into contact with at least one of the engagement features of the annular disk, therein to prevent rotation of the annular disk and of the wheelchair wheel. The moveable member is moveable under and by force oppositely applied so as to withdraw at a second time from any contact with the annular disk, therein to permit rotation of the annular disk and of the wheelchair wheel.

The annular disk is normally divided into interior and exterior, or peripheral, annular regions. The annular disk normally attaches the hub of the wheelchair wheel at an interior region of its annulus, while its circumferentially-arrayed annular features are located at the peripheral region of its annulus.

The annular disk's attachment feature(s) may vary. A number of bolts received into an equal number of bolt holes may be used. The bolts may attach the hub of the wheelchair wheel by bolting to bolt holes of complimentary size and position that are either pre-existing (for some brands of wheelchairs), or drilled and tapped (for other bands of wheelchairs) within the hubs of the wheelchair wheels. The bolts may be supplemented by washers, thereby to attach the hub of the wheelchair's wheel at by compression against the hub spokes. Finally, the central opening of the annular disk may be threaded, permitting it to fit to wheel chairs having threaded hubs.

The annular disk's circumferentially-arrayed peripheral-region engagement features are normally engaged along an axis transverse to a plane of the annular disk, and from a side of the disk opposite the wheel. This makes that the moveable member moves transversely to the plane of the annular disk so as to selectively engage, and disengage, the engagement features.

The engagement features are preferably holes, or apertures, and are more preferably racetrack-shaped apertures. The racetrack shape of the apertures accords some radial tolerance to fitting of the distal end of the moveable member within a juxtaposed aperture.

In greater detail, the moveable member preferably includes a mount, affixed to the frame of the wheelchair, that has a bore in which a sliding element may slide. A sliding element slides within the bore of this mount between (i) an extended position where a distal end of the sliding element contacts and engages the at least one of the multiplicity of engagement features, or apertures, of the annular disk, preventing the disk from rotating, and (ii) a retracted position where neither the annular disk nor any of the annular disk's multiplicity of engagement features, or apertures, are contacted.

The moveable member further includes a spring that positionally force biases the sliding element within the bore of the mount to its extended position. A cable pull, activated by the occupant of the wheelchair, serves to pull the sliding element within the bore of the mount and against the force biasing of the spring until the sliding element assumes its retracted position.

This cable pull preferably consists of a sheathed cable connected at one end to the sliding element; and at the other end to a lever actuator. The lever actuator is mounted to the frame of the wheelchair in a position convenient to the occupant of the wheelchair. The occupant may throw the lever to forcibly pull the cable within its sheath. Notably, sufficient frictional force is exerted in combination by the cable in its sheath, and by the lever actuator, so that once the lever actuator is set by the occupant of the wheelchair to a position moving the sliding element to its retracted position then each of the lever actuator, then the sheathed cable, and the sliding element, will thereafter hold their position then assumed. There is no necessity that the lever actuator should be held against the force of the spring by the occupant of the wheelchair.

2. A Wheelchair Parking Brake

Therefore, in its most preferred expression the present invention is preferably embodied in a parking brake, or wheel lock, for a wheelchair. As before the wheelchair has a frame having an axle rotationally attaching a wheel having a wheel hub.

The most preferred parking brake has an annular disk mounted to the hub of a wheelchair wheel, at a position centered about the wheelchair axle between the wheelchair wheel and the wheelchair frame, for rotation with the wheelchair wheel. This annular disk has and presents in its annular peripheral region a number of circumferentially arrayed holes.

A plunger housing is mounted to the frame of the wheelchair proximate the annular disk. A sliding plunger, having a distal end suitable to fit within a hole of the annular disk, slides under force (i) at least partially within the housing, and (ii) transversely to the plane of the annular disk so as to extend into and retract out of a hole;

A spring within the housing force biases the plunger to its extended position extending into a hole of the annular disk.

Meanwhile a lever operable by an occupant of the wheelchair connects to a cable extending between the lever and the sliding plunger. One position of the lever retracts and holds the sliding plunger against the force of the spring in position outside any hole of the annular disk. Another position of the lever permits the spring to force the sliding plunger to extend from the plunger housing and into a hole of the annular disk, therein to prevent rotation of the annular disk—which is connected to the wheel hub which is connected to the wheelchair wheel—relative to the plunger—which is at least partially within the plunger housing which is mounted to the wheelchair frame. Occupant-controlled extension of the sliding plunger by use of the lever thus serves to selectively lock, and unlock, rotation of the wheelchair's wheel.

The parking brakes, or wheel locks, are most commonly fitted to both wheels of the wheelchair, and can be independently or jointly controlled.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 3 is an exploded view showing the wheelchair parking brake in accordance with the present invention previously seen in FIGS. 1 and 2 in relationship to the frame of the wheel chair previously seen in FIGS. 1 and 2.

FIG. 4 is a detail plan view of a first embodiment of an apertured disk component of the wheelchair parking brake in accordance with the present invention previously seen in FIGS. 1–3.

FIG. 5 is a detail front plan view of mounting plate component of the wheelchair on which is mounted a parking brake in accordance with the present invention previously seen in FIGS. 1–3.

FIG. 6 is a detail side plan view of mounting plate component previously seen in FIG. 5.

FIG. 7 is a cut-away view of the engagement of the plunger and disk components of the wheelchair parking brake in accordance with the present invention previously seen in FIGS. 1–3.

FIG. 8 is a detail perspective view of a second embodiment of an apertured disk component of the wheelchair parking brake in accordance with the present invention previously seen in FIGS. 1–3.

FIG. 9 is a detail perspective view of a second embodiment of an apertured disk component of the wheelchair parking brake in accordance with the present invention previously seen in FIGS. 1–3.

DESCRIPTION OF THE PREFERRED EMBODIMENT

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

Figure 1:
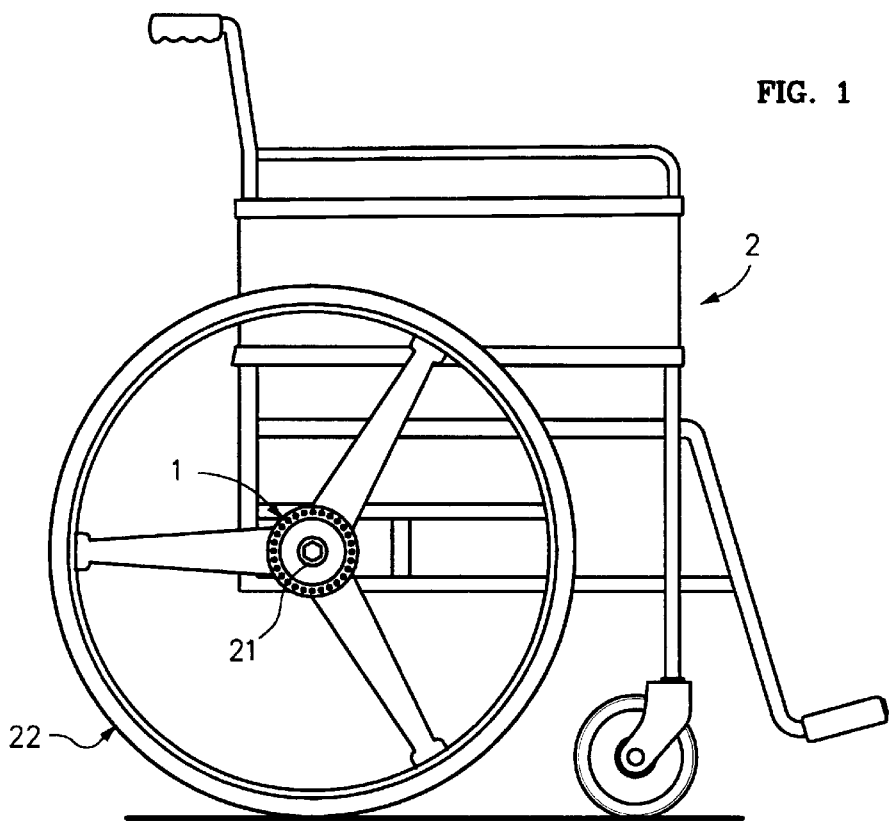
FIG. 1 shows a wheelchair parking brake in accordance with the present invention fitted to a wheel chair.

A wheelchair parking brake 1 in accordance with the present invention is shown fitted at the hub 21 of a wheel 22 of a wheel chair 2 in FIG. 1. An expanded and isolated view of (i) the same wheelchair parking brake 1 and (ii) its attachment to the frame 22 of the wheel chair 2, both previously seen in FIG. 1, is shown in FIG. 2.

Figure 2:
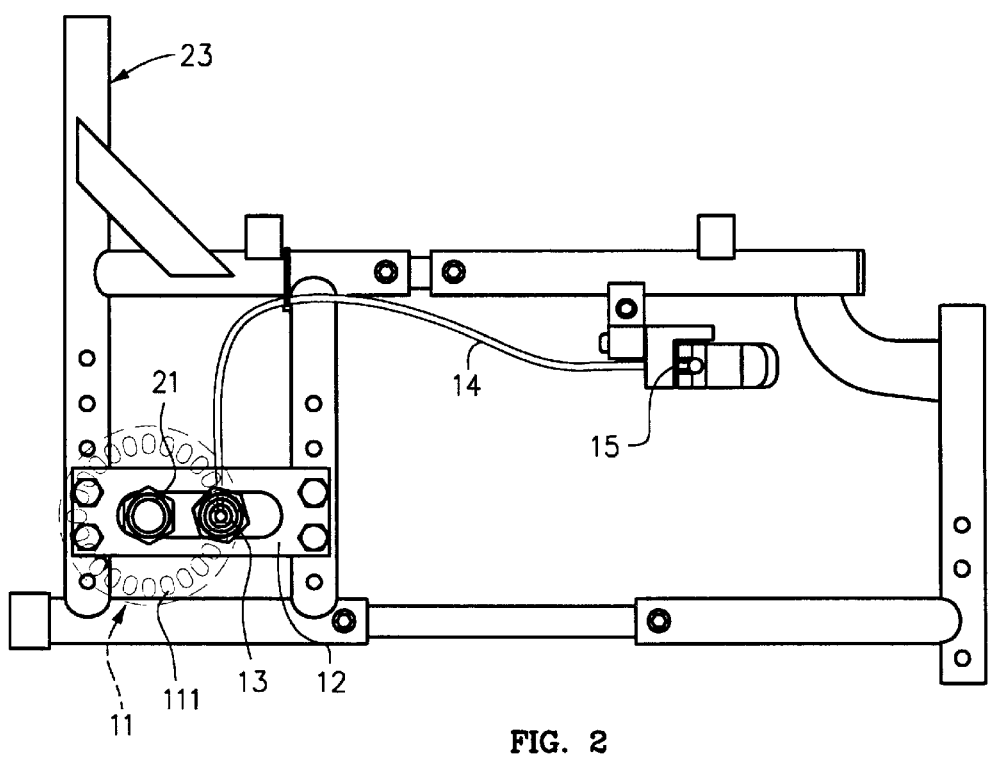
FIG. 2 shows an expanded and isolated view of the wheelchair parking brake in accordance with the present invention previously seen in FIG. 1 with its attachment to the frame of the wheel chair previously seen in FIG. 1.

In FIG. 2, an apertured disk 11 component of the wheelchair parking brake 1 is actually mounted to the wheel 22, and is correspondingly shown in dashed line which more particularly deals with the components of the wheelchair parking brake 1 that are directly mounted to the frame 23 of the wheelchair 2. A mounting plate 12 holds a plunger assembly 13 in position where a plunger 131 (further shown in FIG. 3) will extend and retract to enter and exit the apertures 111 of the apertured disk 11. A sheathed cable 14 connects the plunger assembly 13 to the an actuating, lever, assembly 15. A lever 151 (shown in FIG. 3) of the lever assembly 15 is positioned on the frame 23 of the wheelchair 2 where it may be conveniently accessed and activated by the hand of an occupant of the wheelchair both for applying and releasing the locking function of the wheelchair parking brake 1. There is normally only one wheelchair parking brake 1 fitted to a wheel of the user's choice for the wheelchair 1, although parking brakes can be affixed to both wheels. When the wheelchair parking brake 1 is retrofitted to an existing wheelchair then the same components, alternatively mounted, suffice to install the brake 1 on either wheel of the wheel chair 2, with the plunger assembly 13 on either side of the wheel chair 2.

An exploded view showing the wheelchair parking brake 1 in accordance with the present invention is shown in FIG. 3. The view also shows portions of the frame 23 which are not, strictly speaking, part of the brake 1. The apertured disk 11 is mounted to the wheel 22 (shown in FIG. 1) for rotation therewith, and is more particularly mounted to the wheel hub 221 that revolves about the wheel spindle 222. The mounting illustrated is by action of (four) screws 112, although other manners of mounting are possible. Various hardware permits that the apertured disk 11 stands off from the frame 23 of the wheelchair about the wheel hub 21 of the wheelchair (best observed in FIGS. 1 and 4) so that placement, or retrofitting, of this disk 11 in no way interferes with normal rotation of the wheel 22 of the wheelchair 2 (both shown in FIG. 1).

Meanwhile in FIG. 3, a plunger assembly 13 is mounted to the frame 23 by action of a mounting plate 12, although other affixations including welding are possible. The plunger assembly is so mounted, and adjusted in position relative to mounting plate 12 and frame 23 as necessary, so that a distal end region of it's plunger 131 will pass through a hollow bore of associated nuts and fittings to selectively enter, or withdraw, from the apertures 111 of the disk 11. The distal end of the plunger 131 is beveled to facilitate slippage over the apertured annular surface of a rapidly spinning disk 11, and ultimate passage into an aperture of the apertured disk 11 when the disk 11 is either stopped, or sufficiently slowed in rotation.

Immediate locking of a turning disk 11 and wheel 22 can pitch the occupant of the wheelchair 2 from the wheelchair 2, causing injury. Based on the force of spring 132 next explained, the wheelchair wheel lock of the present invention can be set to aggressively engage and lock even a rapidly rotating disk 11 and wheel 22, but there are limits on the advisability of setting up the wheel lock to engage immediately under all speeds of wheel rotation. The plunger 131 is normally somewhat "soft" in its engagement, "lightly rattling" upon the surface of a spinning disk 11, and finally engaging an aperture and nearly instantaneously stopping any residual rotation of the apertured disk 11 and the wheel 22 only when rotation has already greatly slowed, and has nearly stopped.

The movement of the plunger 131 is in response to (i) force of a spring 132, which spring 132 tends to expel the plunger 131 from its bore and into contact with the disk 11, and (ii) force of a proximal end region connection to an inner cable 141 of the sheathed cable 14, which inner cable 141 pulls the plunger 131 against the force of the spring 132, into the bore, and away from contact with the disk 11. The inner cable 141 of the sheathed cable 14 connects at its end opposite to the plunger 131 and the plunger assembly 13, to the lever 151 of the actuating assembly 15.

This lever 151 as held by mount 152 to the frame 23 of the wheelchair 2 pivots about a pivot axis established by stud 154 so as to extend the inner cable 141 of the sheathed cable 14 to a greater or lessor extent. The stud 154 connects at a one, top, side to the mount 152 by washers, preferably of nylon, and the lock nut 153. The pivoting connection of the lever 151 is more complex. The lower portion of the stud 154 slips a washer, typically made of metal, and passes thorough a one-way roller, or clutch, bearing 156 fitted within a pivot axis bore of the lever 151. A washer and lock nut 155 permit tightening the lever 151 to the lower portion of the stud 1154 to a variable extent. The one-way roller, or clutch, bearing 156 is preferably part number RC-040708 available from Torrington, USA.

In operation, the one-way roller, or clutch, bearing 156 permits that the lever 151 will freely and easily pivot open, pulling the inner cable 141 of the sheathed cable 14 and withdrawing the plunger 131 (against the force of spring 132) from the apertured disk 11. However, by action of this one-way roller, or clutch, bearing 156, the lever 151 will hold position—permitting the wheel 22 to turn, and the wheelchair 2 to roll—without being held by the hand and fingers of the wheelchair occupant. When the lever is engaged by the occupant's fingers, and forcibly rotated so as to permit the plunger 131 to move under the further force of spring 132 to engage and to lock the apertured disk 11, then this rotation cannot be realized by reverse rotation of the one-way roller, or clutch, bearing 156, nor by slippage of the lever 15 about the lower portion of the stud 154. Instead, the upper portion of the stud 154 slips and rotates in the region between the two washers, and in the bore of the mount 152. The friction of this rotation can be adjusted by tightening or by loosening the lock nut 153. Accordingly, rotation of the lever 151 is less difficult, and by action of the free rotation of a roller, or clutch, bearing in its permitted rotational direction, in the rotational direction whereby the wheel lock is released, and is more difficult, and by action of a shaft frictionally slipping within a bore and between nylon washers, in the rotational direction serving to set the wheel lock.

Alignments and tolerances of the sheathed cable 14 are established so that, quite naturally, a positioning of the lever 151 at one extreme of its arc of travel withdraws the plunger 131 securely away from the disk 11 whereas positioning of the lever 151 at the other extreme of its arc of travel permits the distal end of the plunger 131 to enter into the apertures 111 of the disk 11 under the force of spring 132.

A detail plan view of a first embodiment of an apertured disk 11 component of the wheelchair parking brake 1 in accordance with the present invention is shown in FIG. 4. The disk 11 is more properly in the shape of an annular ring, with a central opening sufficiently large so as to accommodate the hub 21 of the wheelchair 2 (shown in FIG. 1). The apertures 11 are preferably elliptical in shape to accommodate minor misalignment with the plunger 131 of the plunger assembly 13. In accordance with the fact the preferred number of apertures is twenty-four (24), as illustrated, the angle D1 is fifteen degrees (15°). The apertured disk 11 is typically 10 cm. outside diameter with a 3.5 cm. inside diameter to its center opening. A various number of threaded screw holes 113, illustrated to be four in number, accommodate, in this embodiment, the screws 112 that affix the disk 11 to the hub 221 (shown in FIG. 3) of the wheelchair wheel 22 (shown in FIG. 1).

As shown in detail front plan view in FIG. 5, and detail side plan view in FIG. 6, the mounting plate 12 also preferably possesses an elliptical, or racetrack-shaped, central aperture 121 to accommodate necessary adjustments and alignments. This mounting plate is normally part of the wheelchair 2, but can be supplied as part of the wheel brake 1 if required. The mounting plate 12 preferably also has and presents striations, normally placed by machining, to promote strong stable compressive mounting to the frame 23 (shown in FIG. 3) of the wheelchair 2 (shown in FIG. 1).

A cut-away view of the engagement of the plunger 131 into an aperture 111 of the disk 11 is shown in FIG. 7. The action of the spring 132 to force the distal end of the plunger 131 into the aperture when distension of the inner cable 141 of the sheathed cable 14 so permits is illustrated.

A detail perspective view of a second embodiment of the apertured disk 11*a* is shown in FIG. 8. A number of stand-offs topped with washers and screws permits the disk 11*a* to be secured to the spokes of a spoked wheel chair wheel in position about the hub of the wheel. Similarly, a detail perspective view of a second embodiment of an apertured disk 11*b* is shown in FIG. 9. This embodiment of the disk 11*b* is threaded at its central aperture to accommodate screwing onto the axle hubs of wheelchairs so having threaded axle hubs. The three embodiments in combination are estimated to fit to, and work with, over ninety percent of the wheelchairs in the U.S., and a large percentage worldwide.

In accordance with the preceding explanation, variations and adaptations of the wheelchair parking brake in accordance with the present invention will suggest themselves to a practitioner of the mechanical design arts.

In accordance with these and other possible variations and adaptations of the present invention, the scope of the invention should be determined in accordance with the following claims, only, and not solely in accordance with that embodiment within which the invention has been taught.

What is claimed is:

1. A wheelchair wheel lock for a wheelchair having a frame rotationally attaching on an axle wheels having wheel hubs, the wheel lock comprising:

an annular disk, attaching the hub of a wheelchair wheel at a position centered about the wheelchair axle between the wheelchair wheel and the wheelchair frame for rotation with the wheelchair wheel by at least one attachment feature, having and presenting circumferentially arrayed in its annulus a multiplicity of apertures of closed circumference that are suitably mechanically engaged so as to prevent rotation of the disk and of the wheelchair wheel to which the annular disk is affixed; and a moveable member, mounted to the frame of the wheelchair proximate the annular disk and having a distal end of complimentary configuration to the apertures of the disk, moveable under and by force provided by an occupant of the wheelchair to variously extend transversely towards, and away from, a plane of the disk;

wherein at a first time the transversely-moving moveable member extends towards the annular disk and into an aperture of the annular disk so as there, at an extended position, to prevent rotation of the annular disk and of the wheelchair wheel; and wherein at a second time the transversely-moving moveable member withdraws away from any contact with the annular disk and from any extension into any aperture so as to there, at a withdrawn position, permit rotation of the annular disk and of the wheelchair wheel.

2. The wheelchair wheel lock according to claim 1 further comprising:

at least one attachment feature attaching the annular disk to the hub of the wheelchair wheel at an interior region of the annulus of the annular disk; and wherein the annular disk's multiplicity of apertures of closed circumference are located at a peripheral region of the annulus of the annular disk.

3. The wheelchair wheel lock according to claim 2 wherein the at least one attachment feature comprises:

a plurality of bolts;

wherein a plurality of bolt holes in the interior regions of the annular disk receive the plurality of bolts; and wherein the annular disk attaches the hub of the wheelchair wheel at the interior region of the annulus of the annular disk by bolting to a plurality of pre-existing bolt holes of complimentary size and position located within a hub of the wheelchair.

4. The wheelchair wheel lock according to claim 3 wherein the at least one attachment feature comprises:

a plurality of bolts; and a plurality of bolt holes receiving the plurality of bolts;

wherein the annular disk so attaches the hub of the wheelchair wheel at an interior region of its annulus by bolting to plurality of bolt holes within the hub of the wheelchair are drilled and tapped at complimentary size and positions to the plurality of bolts; and wherein the plurality of bolts in the bolt holes of the annular disk thread the plurality of holes within the hub of the wheelchair, attaching the annular disk to the wheelchair hub by bolting.

5. The wheelchair wheel lock according to claim 2 wherein the at least one attachment feature comprises:

a plurality of bolts; and a plurality of washers fitting the plurality of bolts;

wherein a plurality of bolt holes at the interior region of the annular disk receive the plurality of bolts; and wherein the annular disk attaches the hub of the wheelchair wheel at interior region of the annulus of the annular disk by compression of the washers against hub spokes of the wheelchair.

6. The wheelchair wheel lock according to claim 1 wherein the annular disk has a threaded central bore;

wherein the annular disk threads upon a threaded hub of the wheelchair wheel.

7. The wheelchair wheel lock according to claim 1 wherein each of the multiplicity of apertures of the annular disk are racetrack-shaped;

wherein the racetrack shape of each of the multiplicity of apertures accords some radial tolerance to fitting of a distal end of the transversely-moveable member.

8. The wheelchair wheel lock according to claim 1 wherein the transversely-moveable member comprises:

a mount, affixed to the frame of the wheelchair, having a bore in which a sliding element may slide;

a sliding element sliding within the bore of the mount between (i) an extended position where a distal end of the sliding element contacts and engages the at least one of the multiplicity of apertures of the annular disk, preventing the disk from rotating, and (ii) a retracted position where neither the annular disk nor any of the annular disk's multiplicity of apertures are contacted;

a spring positionally force biasing the sliding element within the bore of the mount to its extended position; and a cable pull, activated by the occupant of the wheelchair, to pull the sliding element within the bore of the mount and against the force biasing of the spring until the sliding element assumes its retracted position.

9. The wheelchair wheel lock according to claim 8 wherein the cable pull comprises:

a sheathed cable connected at one end to the sliding element; and at the other end to a lever actuator, mounted to the frame of the wheelchair in a position convenient to the occupant of the wheelchair, for pulling under forcible actuation of the lever by the occupant of the wheelchair the cable within its sheath;

wherein sufficient frictional force is exerted in combination by the cable in its sheath, and by the lever actuator, so that once the lever actuator is set by the occupant of the wheelchair to a position moving the sliding element to its retracted position then each of the lever actuator, the sheathed cable, and the sliding element will thereafter hold its position then assumed without any further necessity that the lever actuator should be held against the force of the spring by the occupant of the wheelchair.

10. A parking brake for a wheelchair having a frame having an axle rotationally attaching a wheel having a wheel hub, the parking brake comprising:

an annular disk, mountable to the hub of a wheelchair wheel at a position centered about the wheelchair axle between the wheelchair wheel and the wheelchair wheel for rotation with the wheelchair wheel, having and presenting circumferentially arrayed at a peripheral region of its annulus a multiplicity of holes of closed circumference;

a plunger housing mounted to the frame of the wheelchair proximate the annular disk;

a sliding plunger, having a distal end suitable to fit within a hole of the annular disk, sliding under force at least partially within the housing and transversely to the plane of the annular disk so as to extend into and retract out of a hole;

a spring within the housing for force biasing the plunger to its extended position extending into a hole of the annular disk;

a lever operable by an occupant of the wheelchair; and a cable extending between the lever and the sliding plunger;

wherein one position of the lever retracts and holds the sliding plunger against the force of the spring in position outside any hole of the annular disk; and wherein another position of the lever permits the spring to force the sliding plunger to extend from the plunger housing and into a hole of the annular disk, therein to prevent rotation of the annular disk which is connected to the wheel hub which is connected to the wheelchair wheel relative to the plunger which is at least partially within the plunger housing which is mounted to the wheelchair frame.

11. A parking brake for a wheelchair having a frame having an axle rotationally attaching a wheel having a wheel hub, the parking brake comprising:

an annular disk, mountable to the hub of a wheelchair wheel at a position centered about the wheelchair axle between the wheelchair wheel and the wheelchair wheel for rotation with the wheelchair wheel, having and presenting circumferentially arrayed at a peripheral region of its annulus a multiplicity of holes of closed circumference;

a plunger housing mounted to the frame of the wheelchair proximate the annular disk;

a sliding plunger, having a distal end suitable to fit within a hole of the annular disk, sliding under force at least partially within the housing and transversely to the plane of the annular disk so as to extend into and retract out of a hole;

a spring within the housing for force biasing the plunger to its extended position extending into a hole of the annular disk;

a lever operable by an occupant of the wheelchair; and a sheathed cable extending between the lever and the sliding plunger;

wherein one position of the lever retracts and holds the sliding plunger against the force of the spring in position outside any hole of the annular disk;

wherein another position of the lever permits the spring to force the sliding plunger to extend from the plunger housing and into a hole of the annular disk, therein to prevent rotation of the annular disk which is connected to the wheel hub which is connected to the wheelchair wheel relative to the plunger which is at least partially within the plunger housing which is mounted to the wheelchair frame; and wherein sufficient frictional force is exerted in combination by the cable in its sheath, and by the lever, so that once the lever is set by the occupant of the wheelchair to a position moving the plunger to its retracted position then each of the lever, the sheathed cable, and the plunger will thereafter hold its position then assumed without any further necessity that the plunger should be held against the force of the spring by the occupant of the wheelchair.

* * * * *